US 8,630,505 B2

(12) United States Patent
Kim (10) Patent No.: US 8,630,505 B2
(45) Date of Patent: Jan. 14, 2014

(54) IMAGE PROCESSING DEVICE INCLUDING DEFINITION ENHANCEMENT

(75) Inventor: Taehoon Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1031 days.

(21) Appl. No.: 12/690,518

(22) Filed: Jan. 20, 2010

(65) Prior Publication Data

US 2010/0208141 A1  Aug. 19, 2010

(30) Foreign Application Priority Data

Feb. 13, 2009 (KR) ........................ 10-2009-0012036

(51) Int. Cl.
*G06K 9/40* (2006.01)

(52) U.S. Cl.
USPC ............................ 382/261; 382/167; 382/270

(58) Field of Classification Search
USPC .................. 348/241, 252, 701; 358/1.9, 3.24;
382/118, 167, 176, 190, 195, 232, 254,
382/263, 268, 275, 298
See application file for complete search history.

(56) References Cited

U.S. PATENT DOCUMENTS

| | | | | | |
|---|---|---|---|---|---|
| 5,682,443 | A | * | 10/1997 | Gouch et al. | 382/254 |
| 5,796,870 | A | * | 8/1998 | Takeo | 382/232 |
| 6,057,935 | A | * | 5/2000 | Freeman | 358/1.9 |
| 6,252,995 | B1 | * | 6/2001 | Takamori | 382/254 |
| 6,788,824 | B1 | * | 9/2004 | Prestia | 382/263 |
| 8,005,318 | B2 | * | 8/2011 | Ou et al. | 382/298 |
| 2003/0189655 | A1 | * | 10/2003 | Lim et al. | 348/241 |
| 2004/0042644 | A1 | * | 3/2004 | Yuasa et al. | 382/118 |
| 2004/0223643 | A1 | * | 11/2004 | Irwin | 382/176 |
| 2005/0147319 | A1 | * | 7/2005 | Deshpande et al. | 382/268 |
| 2005/0276510 | A1 | * | 12/2005 | Bosco et al. | 382/275 |
| 2007/0296871 | A1 | * | 12/2007 | Yoo et al. | 348/701 |
| 2008/0012968 | A1 | * | 1/2008 | Lim et al. | 348/252 |
| 2008/0159645 | A1 | * | 7/2008 | Kempf et al. | 382/264 |
| 2009/0022402 | A1 | * | 1/2009 | Lee et al. | 382/195 |
| 2009/0196524 | A1 | * | 8/2009 | Godin | 382/263 |
| 2009/0220155 | A1 | * | 9/2009 | Yamamoto et al. | 382/190 |
| 2010/0091333 | A1 | * | 4/2010 | Bailey | 358/3.24 |
| 2010/0215267 | A1 | * | 8/2010 | Aldrich et al. | 382/167 |

FOREIGN PATENT DOCUMENTS

| | | |
|---|---|---|
| JP | 2005-175718 | 6/2005 |
| KR | 100791388 B1 | 12/2007 |
| KR | 1020080010832 A | 1/2008 |
| KR | 1020080018690 A | 2/2008 |

OTHER PUBLICATIONS

Polesel, A., et al., "Image enhancement via adaptive unsharp masking," IEEE Trans. on Image Processing, vol. 9, No. 3, p. 505-510, Mar. 2000.*

* cited by examiner

*Primary Examiner* — Vikkram Bali
*Assistant Examiner* — Xuemei Chen
(74) *Attorney, Agent, or Firm* — Myers Bigel Sibley & Sajovec, P.A.

(57) ABSTRACT

Image processing devices include a color extractor circuit configured to extract color information from input image data, a color shifter circuit configured to color shift the input image data according to the extracted color information and a definition enhancement circuit configured to detect a color difference from the color-shifted image data and to unsharp mask filter the color-shifted image data according to the detected color difference.

7 Claims, 14 Drawing Sheets

Original

Fig. 9B

Strong Mode

Fig. 9C

Weak Mode

Fig. 9D

Adaptive Mode

Fig. 10A

Original

Fig. 10B

Strong Mode

Fig. 10C

Weak Mode

Fig. 10D

Adaptive Mode

IMAGE PROCESSING DEVICE INCLUDING DEFINITION ENHANCEMENT

CROSS-REFERENCE TO RELATED APPLICATIONS

This U.S. non-provisional patent application claims priority under 35 U.S.C. §119 of Korean Patent Application No. 10-2009-0012036, filed on Feb. 13, 2009, the entire contents of which are hereby incorporated by reference.

BACKGROUND

The present invention relates to image processing devices and methods, and more particularly, to apparatus and methods for enhancing image definition.

An image input/output devices, such as a digital still camera (DSC), a camcorder, and a digital television (DTV), may be costly due to the use of a high-definition image sensor capable of processing high-quality and high-definition images, and an accompanying larger memory compared to low-definition devices. Several techniques, such as zooming a low-definition image to a high-definition image, have been introduced for cost reduction.

During a zooming procedure, image degradation may occur because of the noise, blurring, and smearing of images, etc. To relieve such image degradation, definition enhancing techniques that emphasize details of an image and sharpen boundaries may be used.

A conventional definition enhancing technique may process the whole image using a single unsharp mask filter (UMF) coefficient. This technique may excessively enhance definition in an area where there is little color change in an image, thus leading to image degradation. In particular, there may be more areas with a slight color change in a high-definition image and, therefore, image degradation becomes more serious in the high-definition image.

SUMMARY

Some embodiments of the present invention provide image processing devices including a color extractor circuit configured to extract color information from input image data, a color shifter circuit configured to color shift the input image data according to the extracted color information and a definition enhancement circuit configured to detect a color difference from the color-shifted image data and to unsharp mask filter the color-shifted image data according to the detected color difference.

The extracted color information may include a minimum brightness value and a maximum brightness value and the color shifter circuit may be configured to color shift the input image data responsive to the minimum and maximum brightness values. The color shifter circuit may be further configured to determine a gain responsive to the extracted color information and the definition enhancement circuit may be configured to apply the determined gain to the unsharp mask filtered image data.

In some embodiments, the definition enhancement circuit may include a filter configured to unsharp mask filter the color-shifted image data, a color difference and gain controller circuit configured to detect the color difference from the color-shifted image data and to adaptively modify or replace the unsharp mask filtered image data according to the detected color difference to generate adaptively processed image data. The definition enhancement circuit may further include a gain multiplier circuit configured to apply the determined gain to the adaptively processed image data.

The color shifter circuit may be further configured to determine a high gain and a low gain responsive to the extracted color information. The gain multiplier circuit may be configured to generate low gain image data and high gain image data from the adaptively processed image data according to the determined high gain and low gain.

The definition enhancement circuit may further include a channel difference checker circuit configured to compare image data for center pixels of groups of pixels of the color-shifted image data to the high gain image data. The channel difference checker circuit may be configured to generate a gain select signal responsive to the comparison of the image data for the center pixels to the high gain image data and the definition enhancement circuit may further include a multiplexer configured to selectively output the high gain image data and the low gain image data responsive to the comparison.

In additional embodiments, the color difference and gain controller circuit may include a color difference detector circuit configured to detect the color difference by comparing image data for center pixels of respective groups of pixels of the color-shifted image data to image data for pixels surrounding the center pixels in the respective groups, and an image data modification circuit configured to modify the unsharp mask filtered image data according to the detected color difference. The image data modification circuit may include a first multiplexer configured to selectively provide the image data for the center pixels or unsharp mask filtered image data to the gain multiplier circuit and a gain controller circuit configured to control the first multiplexer responsive to the detected color difference.

The image data modification circuit may further include a shifter configured to scale the unsharp mask filtered image data and a second multiplexer configured to selectively provide the unsharp mask filtered image data or the scaled unsharp mask filtered image data to the first multiplexer. The gain controller circuit may be further configured to control the second multiplexer responsive to the detected color difference. The gain controller circuit and the first and second multiplexers may be configured to provide the image data for the center pixels to the gain multiplier circuit when the detected color difference is less than a first threshold, to provide the scaled unsharp mask filtered image data to the gain multiplier circuit when the detected color difference is greater than the first threshold and less than a second threshold and to provide the unsharp mask filtered image data to the gain multiplier when the detected color difference is greater than the second threshold.

BRIEF DESCRIPTION OF THE DRAWINGS

The accompanying drawings are included to provide a further understanding of the inventive subject matter, and are incorporated in and constitute a part of this specification. The drawings illustrate embodiments of the inventive subject matter and, together with the description, serve to explain principles of the inventive subject matter. In the drawings.

DETAILED DESCRIPTION OF EMBODIMENTS

Hereinafter, exemplary embodiments of the present invention will be described with reference to the accompanying drawings to fully explain the inventive subject matter in such a manner that it may easily be carried out by a person with ordinary skill in the art to which the present invention pertains.

To enhance definition for a high-quality image, a degree of definition enhancement may be controlled by determining whether it is necessary to increase the image enhancement degree for each image block to be processed and then decreasing or increasing an unsharp mask filter (UMF) coefficient. Embodiments of the inventive subject matter provide apparatus and methods for effectively controlling definition enhancement by detecting, for an image processing block, an area requiring definition enhancement, and adjusting a UMF coefficient to provide appropriate definition enhancement.

Figure 1:
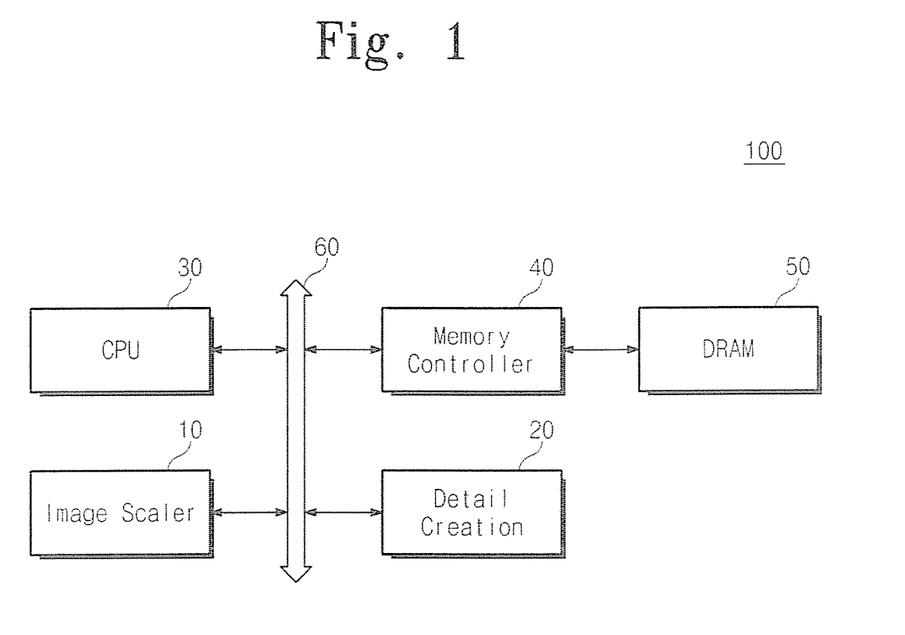
FIG. 1 is a block diagram illustrating an image system according, to some embodiments of the inventive subject matter.

FIG. 1 is a block diagram illustrating an image system 100 according to some embodiments of the inventive subject matter. The image system 100 includes an image scaler circuit 10, a detail creation circuit 20, a central processing unit (CPU) 30, a memory controller circuit 40, an external memory 50, and a system bus 60.

The image scaler circuit 10 changes a resolution of an image input thereto, and stores the image with changed resolution in the memory 50. The image scaler circuit 10 also may remove an aliasing artifact phenomenon that may occur when changing the resolution of the input image. The detail creation circuit 20 enhances the definition of the input image, and will be more fully described with reference to FIGS. 2 and 4. The CPU 30 may include, for example, an ARM® processor. The memory 50 may include, for example, a DRAM.

The memory controller circuit 40 accesses the external memory 50 in response to the control of the CPU 30. The external memory 50 stores an image scaled up by the image scaler circuit 10, or stores an image definition enhanced by the detail creation circuit 20. The system bus 60 interconnects the image scaler circuit 10, the detail creation circuit 20, the CPU 30, and the memory controller circuit 40.

Figure 2:
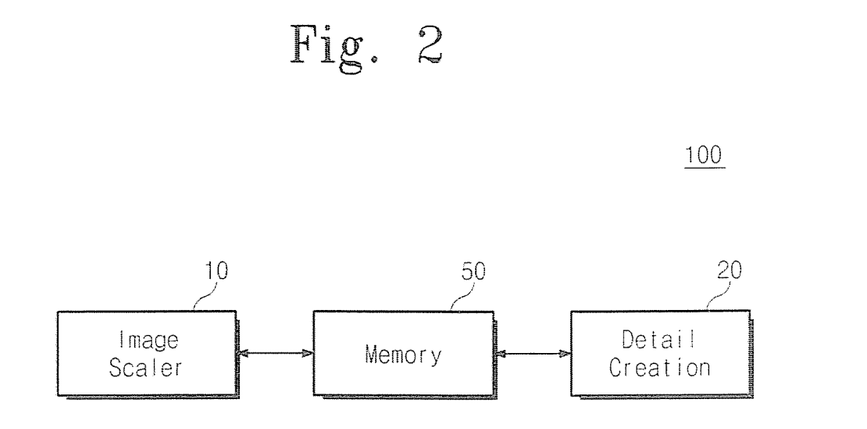
FIG. 2 is a block diagram illustrating interoperation of an image scaler circuit and detail creation circuit of FIG. 1.

FIG. 2 is a block diagram illustrating interoperation of the image scaler circuit 10 and the detail creation circuit 20 in FIG. 1. The image scaler circuit 10 stores the scaled-up (i.e., resolution-enhanced) image in the external memory 50. The detail creation circuit 20 receives the resolution-enhanced image stored in the external memory 50 and enhances the definition thereof. The external memory 50 stores the scaled-up and definition-enhanced image.

The image scaler circuit 10 stores the resolution-enhanced image in an internal buffer memory, and the detail creation circuit 20 may receive the resolution-enhanced image stored in the internal buffer memory to thereby enhance the definition.

Figure 3:
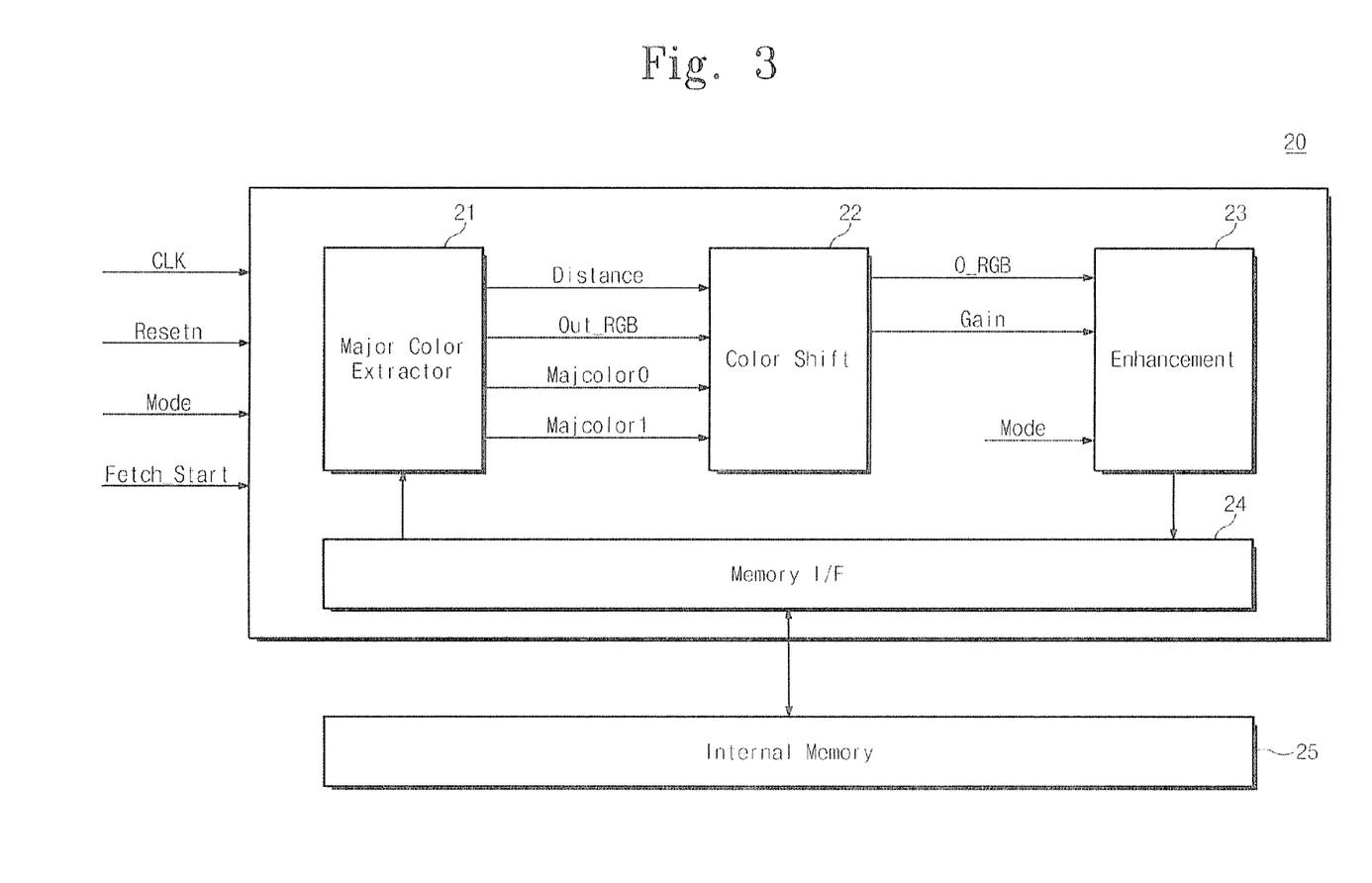
FIG. 3 is a block diagram illustrating and implementation of the detail creation circuit of FIG. 2.

FIG. 3 is a block diagram illustrating an implementation of the detail creation circuit 20 of FIG. 2. The creation circuit 20 includes a major color extractor circuit 21, a color shifter circuit 22, a definition enhancement circuit 23, and a memory interface circuit 24.

The major color extractor circuit 21 reads out the image stored in an internal memory 25 though the memory interface circuit 24, and extracts a major color (i.e., maximum value or minimum value) from the read-out image. Operations for extracting a major color according to some embodiments of the inventive subject matter are described below with reference to FIG. 6.

Figure 6:
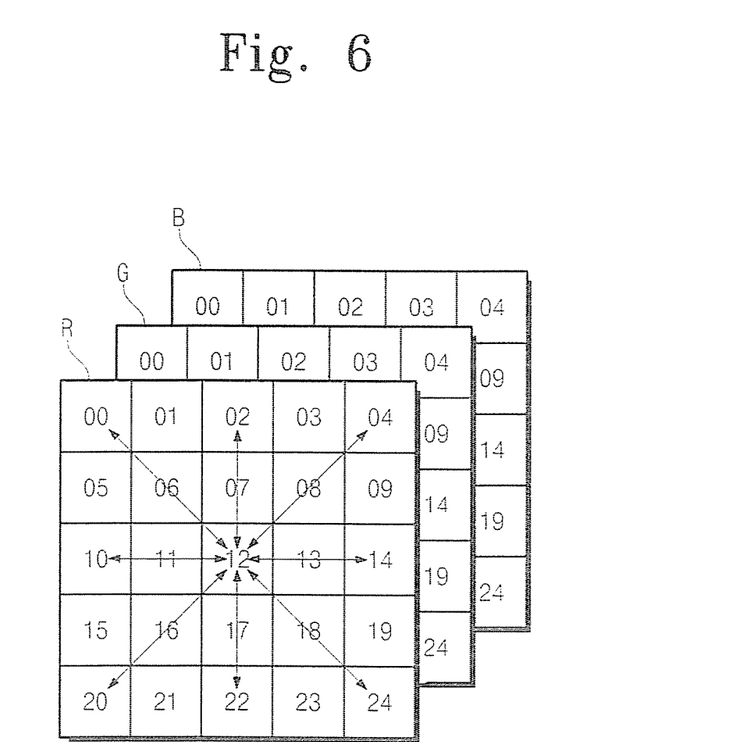
FIG. 6 illustrates operations for detecting a color difference according to some embodiments of the inventive subject matter.

The major color extractor circuit 21 extracts the maximum value and the minimum value for brightness of each pixel from image data of 5×5 pixels (shown in FIG. 6). The major color extractor circuit 21 calculates a distance signal (Distance) indicating a difference between the maximum value and the minimum value. The major color extractor circuit 21 amplifies the brightness of each pixel from the image data of 5×5 pixels by four to thereby generate image output data (Out_RGB). The major color extractor circuit 21 transmits the distance signal (Distance), a maximum value signal (Majcolor0) and a minimum value signal (Majcolor1), and the image output data (Out_RGB), to the color shifter circuit 22.

The detail creation circuit 20 operates in response to a Fetch_start signal. In particular, when the minimum amount of image data (e.g., 5×5 pixels) is stored in the internal memory 25, the Fetch_start signal is activated.

The color shifter circuit 22 shifts each image output data (Out_RGB) toward one of the maximum value (Majcolor0) and the minimum value (Majcolor1), which is closer thereto, by the use of the major color (i.e., maximum value or minimum value) extracted from the major color extractor circuit 21. The color shifter circuit 22 calculates a gain (Gain) using the distance signal (Distance) transmitted from the major color extractor circuit 21. The color shifter circuit 22 generates a gain (Gain) and output image data (O_RGB).

The definition enhancement circuit 23 adaptively applies a UMF to enhance the definition of the image. An implementation of the definition enhancement circuit 23 according to some embodiments of the inventive subject matter is described below with reference to FIG. 4.

The memory interface circuit 24 writes and reads image data to and from the internal memory 25. Although rapid reading and storing may occur through the internal memory 25, rapid reading and storing may be realized using the external memory 50 that is shown in FIG. 1.

Figure 4:
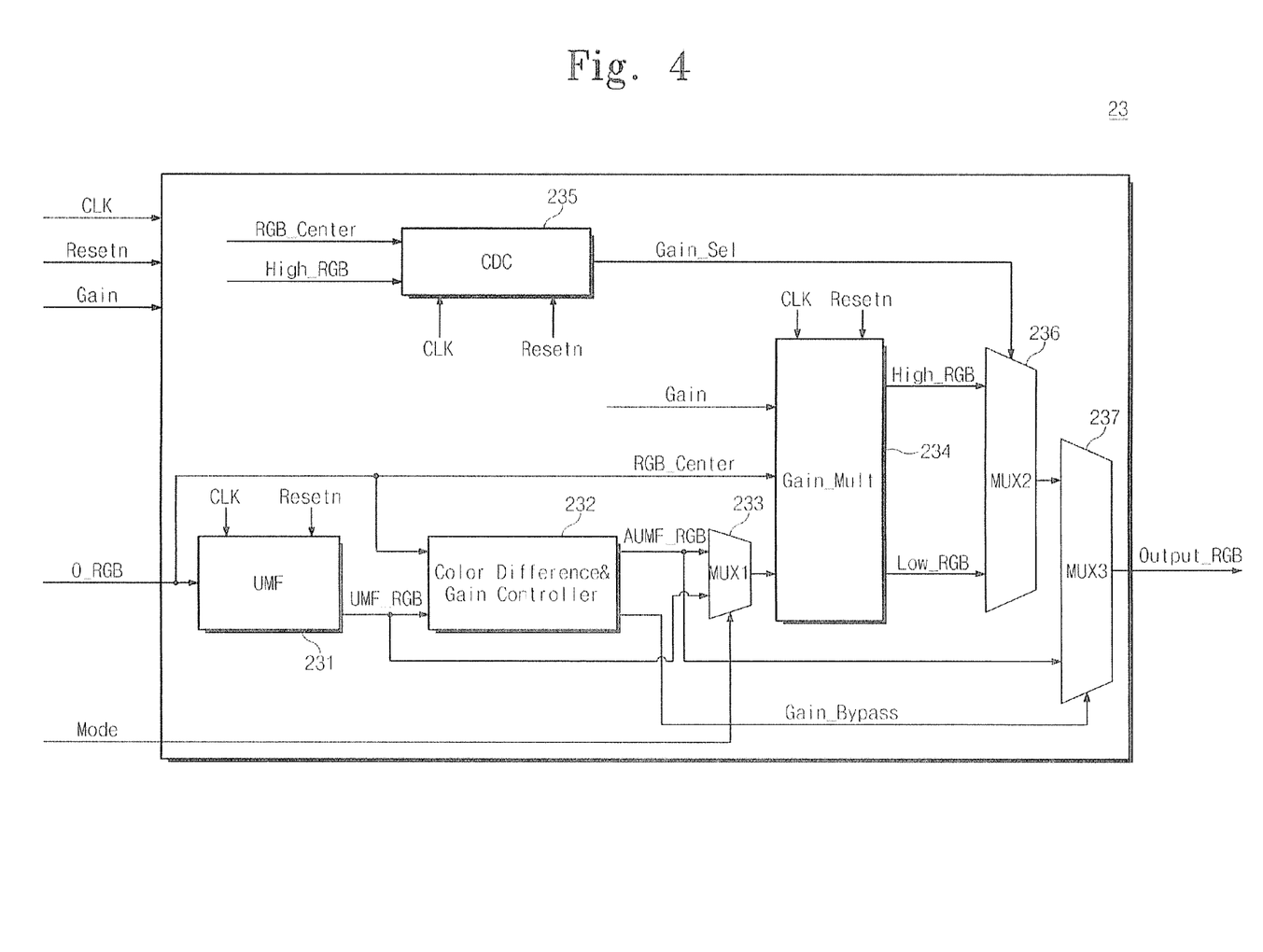
FIG. 4 is a block diagram illustrating an implementation of the definition enhancement circuit of FIG. 3.

FIG. 4 is a block diagram illustrating an implementation of the definition enhancement circuit 23 of FIG. 3. The definition enhancement circuit 23 includes a UMF 231, a color difference and gain controller circuit 232, a first multiplexer (MUX1) 233, a gain multiplier circuit 234, a channel difference checker (CDC) circuit 235, a second multiplexer (MUX2), and a third multiplexer (MUX3) 237.

The UMF 231 outputs filtered RGB data UMF_RGB by applying an UMF to image data O_RGB. The color difference and gain controller circuit 232 receives the filtered RGB data UMF_RGB and performs an adaptive UMF operation. The color difference and gain controller circuit 232 outputs adaptively filtered data AUMF_RGB. An implementation of the color difference and gain controller circuit 232 is described below with reference to FIG. 5.

The first multiplexer 233 outputs the filtered RGB signal UMF_RGB or the adaptively filtered RGB signal AUMF_RGB in response to a mode signal Mode. When the mode signal Mode is activated, a result according to the adaptive UMF operation is output. When the mode signal Mode is deactivated, a result according to the general UMF operation is output. That is, whether to apply the adaptive UMF operation is determined depending on the activation/deactivation of the mode signal Mode.

The gain multiplier circuit 234 multiplies the output of the first multiplexer 233 by the gain Gain transmitted from the color shifter circuit 22. The gain signal Gain may include a high gain signal and a low gain signal. The gain multiplier circuit 234 generates a high gain RGB signal High_RGB by multiplying the output of the first multiplexer 233 by the high gain signal. Likewise, the gain multiplier circuit 234 generates a low gain RGB signal Low_RGB by multiplying the output of the first multiplexer 233 by the low gain signal. The gain multiplier circuit 234 transmits the high gain and low gain RGB signals High_RGB, Low_RGB signals to the second multiplexer 236.

The CDC circuit 235 receives center data RGB_Center of the input image data O_RGB and the high gain RGB signal High_RGB. The CDC circuit 235 compares the center data RGB_Center and the high gain RGB signal High_RGB, and then generates a gain select signal Gain_sel based on consideration of noise of these signals. Also, the CDC circuit 235 checks a grey valence for the center data RGB_Center to generate the gain select signal Gain_sel.

The gain select signal Gain_sel generated by the CDC circuit 235 controls the second multiplexer 236. The grey valence means that a difference between the center data RGB-Center and each datum of the red (R), green (G) and blue (B) data is a predetermined bit or less. If the center data RGB_Center belong to a grey area meeting such a grey valence criterion, the second multiplexer 236 outputs the low gain RGB signal Low_RGB to the third multiplexer 237. Otherwise, the second multiplexer 236 outputs the high gain RGB signal High_RGB to the third multiplexer 237.

Figure 5:
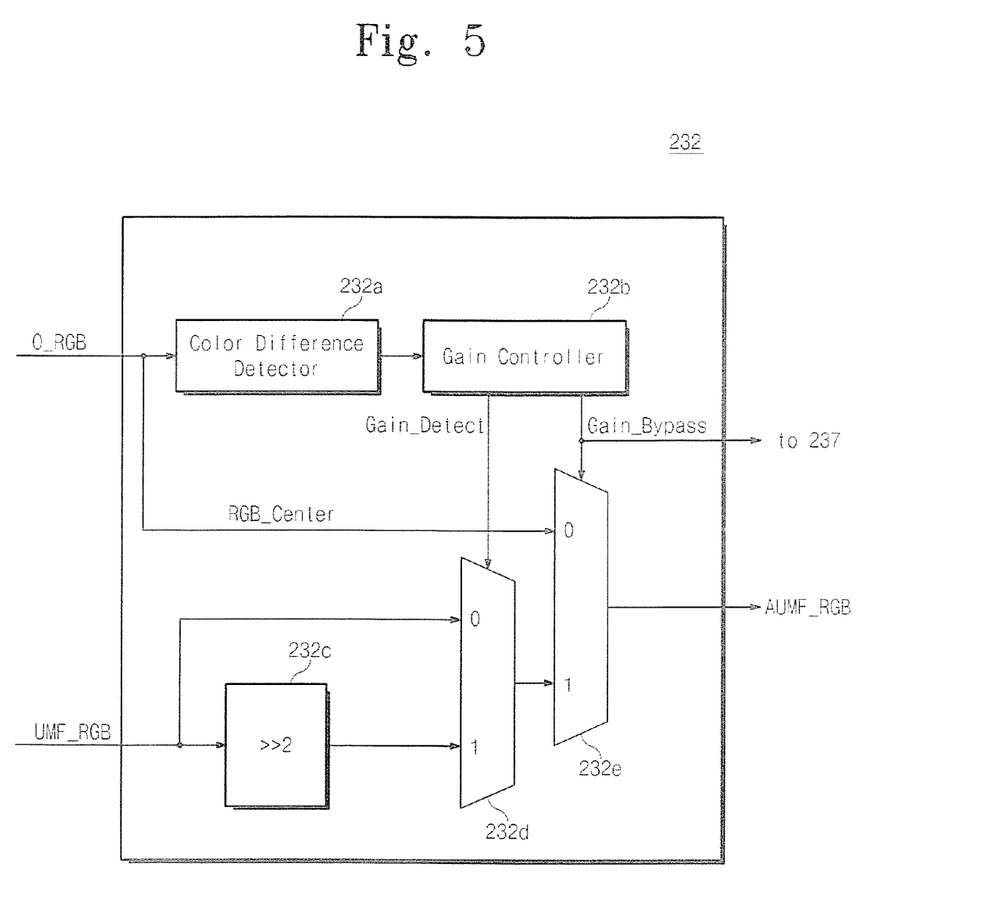
FIG. 5 is a block diagram illustrating an implementation of the color difference and gain controller circuit of FIG. 4.

FIG. 5 is a block diagram illustrating an implementation of the color difference and gain controller circuit 232 of FIG. 4. FIG. 6 illustrates operations for detecting, a color difference that may be implemented by the circuit of FIG. 5.

Referring to FIGS. 4 and 5, the color difference and gain controller circuit 232 includes a color difference detector circuit 232a, a gain controller circuit 232b, a 2-bit shifter 232c, and first and second multiplexers 232d and 232e. The color difference detector circuit 232a generates a signal indicating a color difference from the input image data O_RGB according to Equation 1 below:

$$\text{Color\_Diff} = (|00-12|+|02-12|+|04-12|+|10-11|+|14-12|+|20-11|+|22-14|+|24-12|)/8 \quad (1)$$

In Equation 1, the numbers correspond to 5×5 pixels shown in FIG. 6.

The gain controller circuit 232b receives the color difference signal output from the color difference detector circuit 232a. The gain controller circuit 232b categorizes the color difference Color_Diff as shown below:

Case1: Color_Diff<Threshold_low
Case2: Threshold_low<Color_Diff<Threshold_high
Case3: Color_Diff>Threshold_high It is assumed that the input data O_RGB of each of R, G and B has a value ranging from 0 to 255.

For example, some embodiments of the inventive subject matter may use a lower threshold Threshold_low of 4 and a higher threshold Threshold_high of 8. For these thresholds, the first case Case1 is that the color difference Color_Diff is less than 4. In this case, there is little or no color difference for the input data O_RGB. To bypass the output of the gain multiplier circuit 234, the gain controller circuit 232b activates a gain bypass signal Gain_Bypass. The third multiplexer 237 is controlled by the gain bypass signal Gain_Bypass.

The second case Case2 is that the color difference Color_Diff is greater than 4 but less than 8. In this case, the color difference of the input data O_RGB is relatively small. The 2-bit shifter 232c reduces the filtered RGB data UMF_RGB by one quarter (¼). The 2-bit shifter 232c transmits the ¼-reduced filtered RGB data to the first multiplexer 232d. The gain controller circuit 232b activates a gain detect signal Gain_Detect such that the ¼-reduced filtered RGB data is output to the second multiplexer 232e from the first multiplexer 232d.

The third case Case3 is that the color difference Color_Diff is greater than 8. In this case, the color difference of the input data O_RGB is relatively large. The gain controller circuit 232b deactivates the gain detect signal Gain_Detect such that the filtered RGB data is output to the second multiplexer 232e from the first multiplexer 232d.

Table 1 shows the cases described above:

TABLE 1

| | |
|---|---|
| If(Color_Diff < 4) | |
| Gain_Bypass =1; | //Case1 |
| else If(4 < Color_Diff < 8) | |
| Gain_Detect = 1; | //Case2 |
| else | |
| Gain_Bypass = Gain_Detect = 0; | //Case3 |

Referring to FIGS. 4 through 6, the input data includes 5×5 red input data (R) for, 5×5 green input data (G), and 5×5 blue input data (B). Data 12 corresponds to center data RGB_Center. According to some embodiments of the inventive subject matter, the maximum or minimum value is determined when comparing each of input data 00 to 11 and 13 to 24 and the center data 12. In some embodiments of the inventive subject matter, only eight data among 5×5 input data are compared with the center data 12. For example, 00, 02, 04, 10, 14, 20, 22 and 24 are compared with the center data 12. The eight data 00, 02, 04, 10, 14, 20, 22 and 24 are the date referred to in Equation 1.

Figure 7:
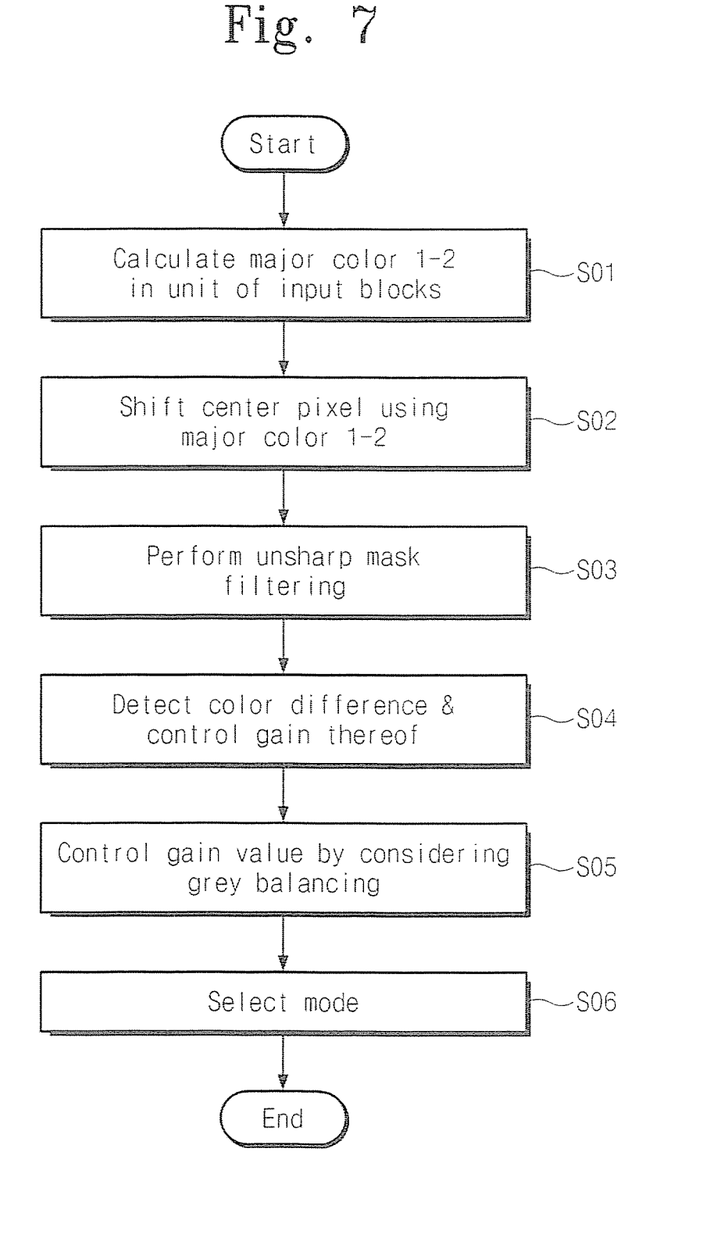
FIG. 7 is a flowchart illustrating detail creation operations according to some embodiments of the inventive subject matter.

FIG. 7 is a flowchart illustrating operations of the detail creation circuit 20 in FIG. 3. The major color extractor circuit 21 divides input image data in units of blocks (for example, 5×5 pixels), and extracts the major color of each block (block S01). The major color is set to the maximum or minimum value of the input image data. The color shifter circuit 22 shifts the color of the center pixel RGB_Center by the use of the major color (block S02). In particular, the color shifter circuit 22 increases the color of the center pixel RGB_Center toward the maximum value if the center pixel is close to the maximum value, and the color shifter circuit 22 decreases the color of the center pixel RGB_Center toward the minimum value if the center pixel is close to the minimum value. The UMF 231 filters the input image data O_RGB (block S03). The color difference and gain controller circuit 232 detects a color difference and controls the resultant gain (block S04). The gain controller circuit 232b controls the gain value by comparing the center pixel RGB_Center and the maximum gain image data High_RGB (block S05). The output image data output_RGB is output according, to the mode signal Mode (block S06).

Figure 8:
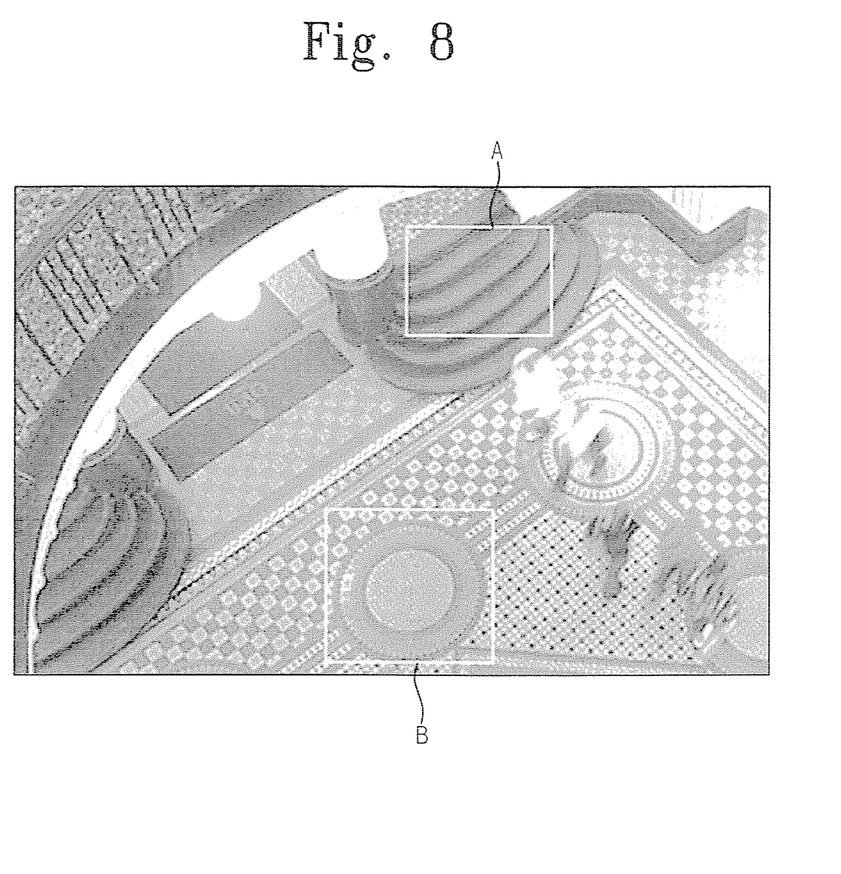
FIG. 8 illustrates an image before application of a UMF.

FIG. 8 illustrates an original image before UMF is applied. In FIG. 8, a portion A denotes an area with small color difference, and a portion B denotes an area with large color difference.

Figure 9A:
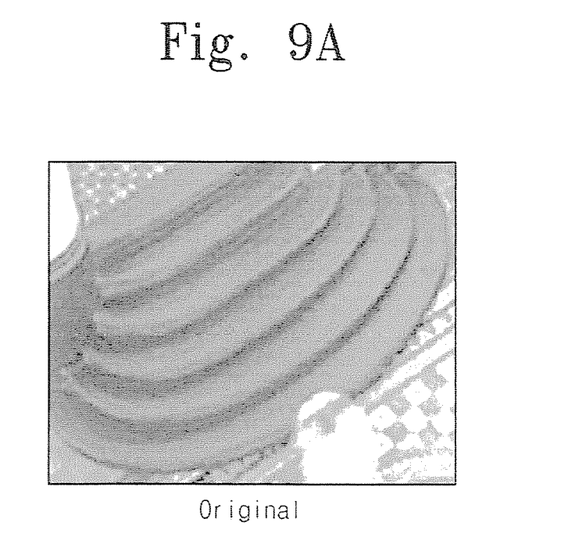
FIG. 9A illustrates a portion of the image of FIG. 8 before application of the UMF.
Figure 9B:
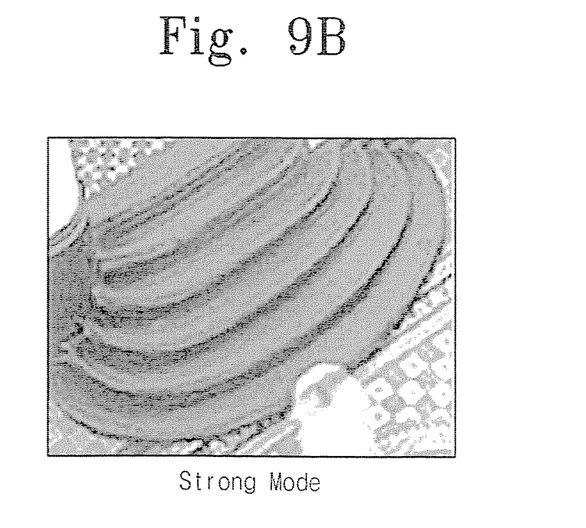
FIG. 9B illustrates an image obtained by applying a high UMF coefficient to the image portion of FIG. 9A.
Figure 9C:
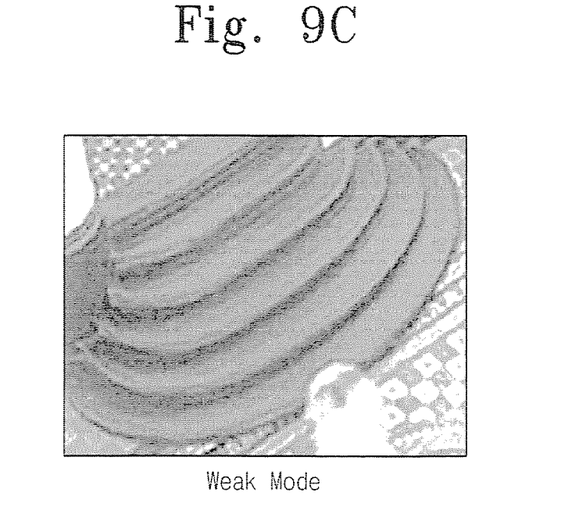
FIG. 9C illustrates an image obtained by applying a low UMF coefficient to the image portion of FIG. 9A.
Figure 9D:
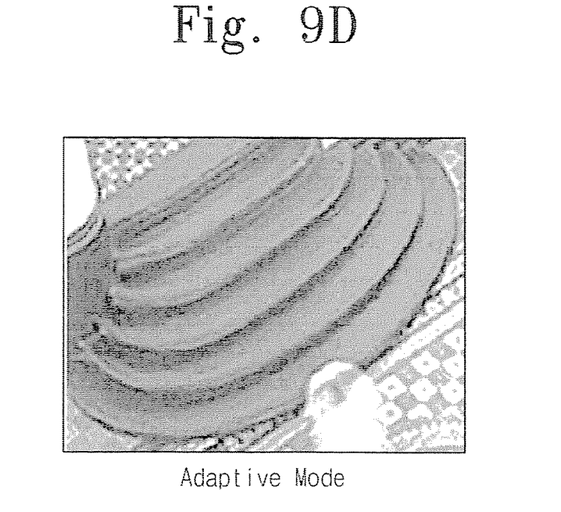
FIG. 9D illustrates an image obtained by applying an adaptive UMF to the image portion of FIG. 9A.

FIGS. 9B through 9D respectively illustrate an image obtained when a high UMF coefficient is applied to the portion A of the original image shown in FIG. 8 in a "strong" mode, an image obtained when a low UMF coefficient is applied in a "weak" mode, and an image obtained when an adaptive UMF applied in an "adaptive" mode. FIGS. 10B through 10D respectively illustrate an image obtained when a high UMF coefficient is applied to the portion B of the original image shown in FIG. 8 in a "strong" mode, an image obtained when a UMF coefficient is applied in a "weak" mode, and an image obtained when an adaptive UMF is performed in an "adaptive" mode.

FIG. 9B shows that the image of the portion A is very coarse in comparison with the portion A of the original image in FIG. 9A. Such a coarse image typically appears when a UMF coefficient is high. FIG. 9C shows that the definition of the image of the portion A is worse than the image of FIG. 9B. FIG. 9D shows very good image compared to the images in FIGS. 9B and 9C. It appears that the adaptive UMF procedure enhances the definition by appropriately controlling a filter coefficient.

Figure 10A:
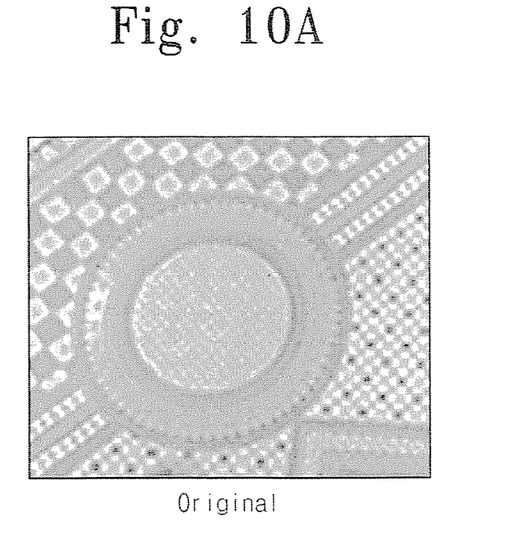
FIG. 10A illustrates a portion of the image of FIG. 8 before a UMF is applied.
Figure 10B:
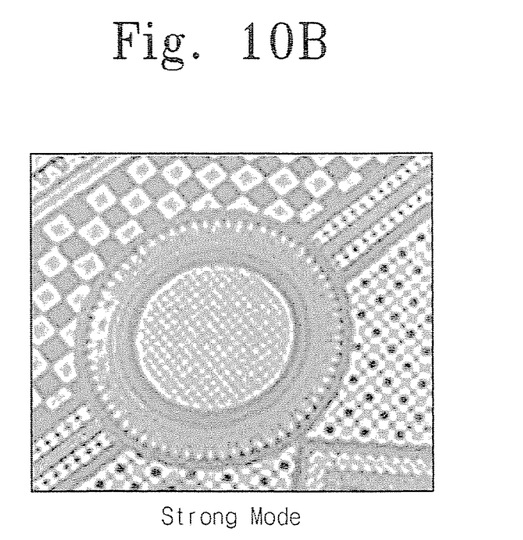
FIG. 10B illustrates an image obtained by applying a high UMF coefficient to the image portion of FIG. 10A.
Figure 10C:
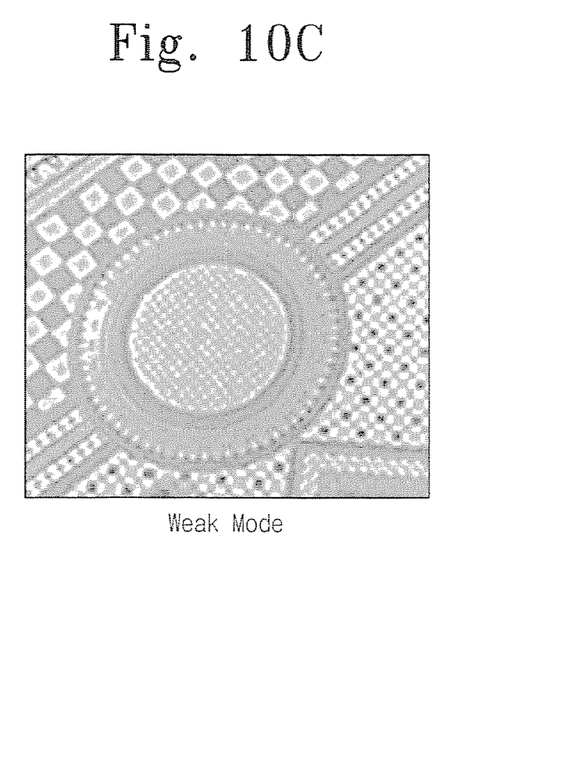
FIG. 10C illustrates an image obtained by applying a low UMF coefficient to the image portion of FIG. 10A.
Figure 10D:
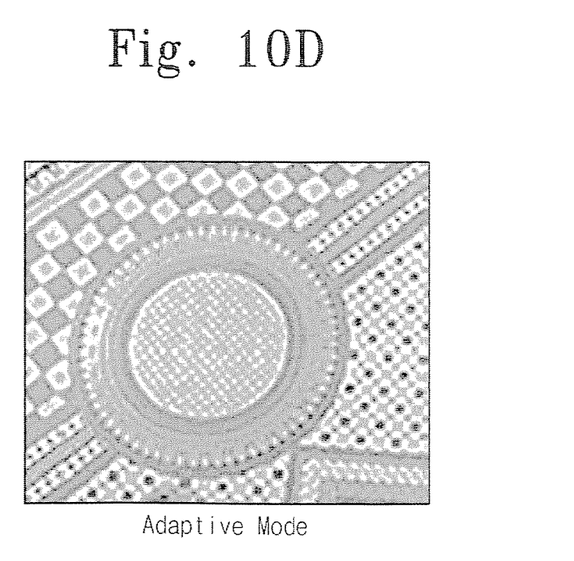
FIG. 10D illustrates an image obtained by applying an adaptive UMF to the image portion of FIG. 10A.

FIG. 10B shows that the image of the portion B is very coarse in comparison with the portion B of the original image in FIG. 10A. Such a coarse image typically appears when a UMF coefficient is high. FIG. 10C shows that the definition of the image of the portion B is worse than the image of FIG. 10B. FIG. 10D shows a relatively good image compared to the images in FIGS. 10B and 10C.

Figure 11:
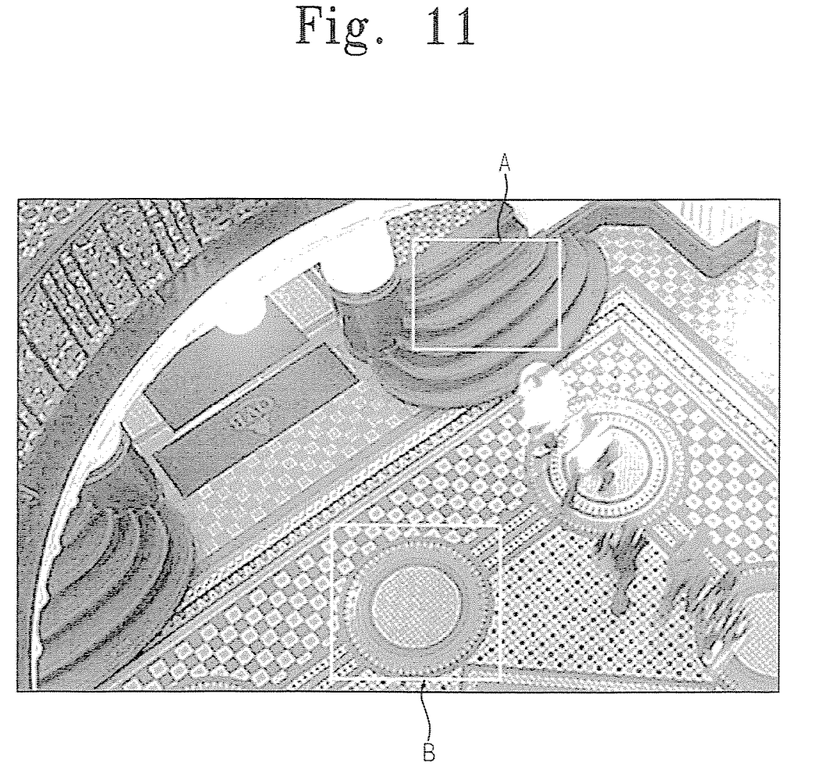
FIG. 11 illustrates an image obtained by applying a high UMF coefficient to the image of FIG. 8.
Figure 12:
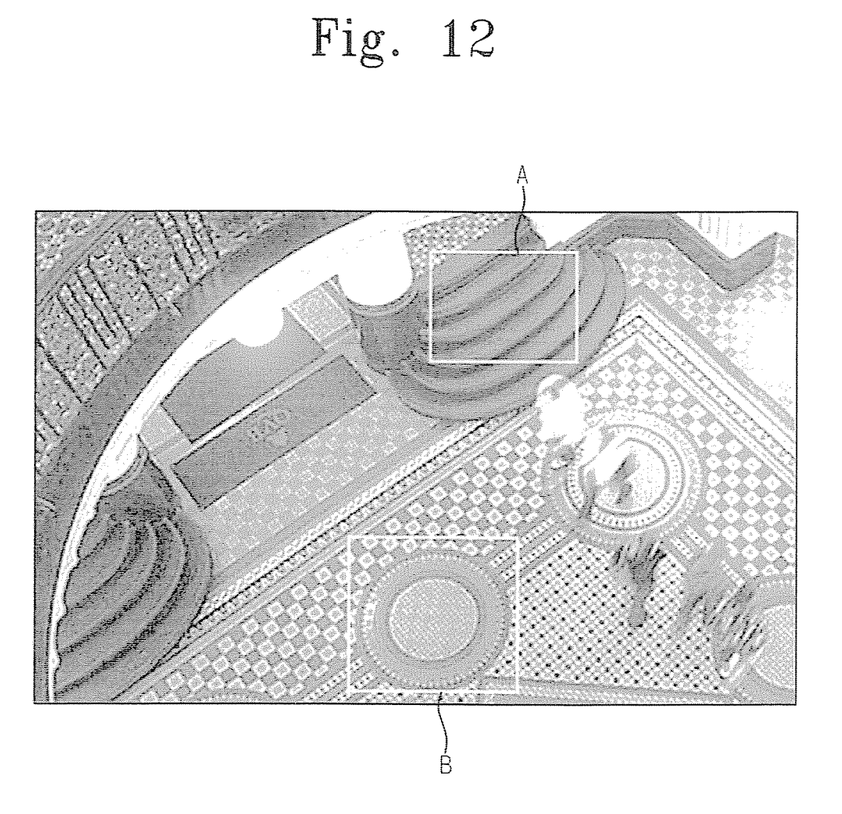
FIG. 12 illustrates an image obtained by applying a low UMF coefficient to the image of FIG. 8.
Figure 13:
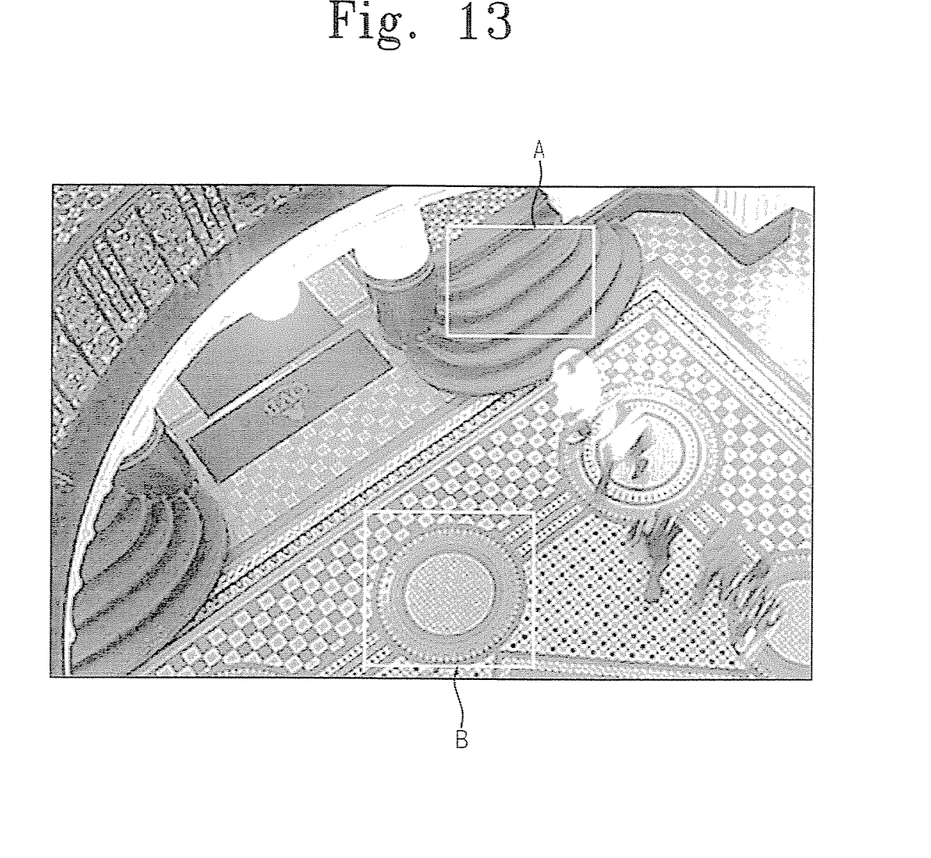
FIG. 13 illustrates an image obtained by applying an adaptive UMF to the image of FIG. 8.

FIG. 11 illustrates an image obtained by applying high UMF coefficient to the original image in FIG. 8. FIG. 12 illustrates an image obtained by applying low UMF coefficient to the original image in FIG. 8. FIG. 13 illustrates an image obtained by applying adaptive unsharp mask filtering to the original image in FIG. 8.

FIG. 11 shows that the image is very coarse in comparison with the original image in FIG. 8. FIG. 12 shows that the definition of the image is worse than the image in FIG. 11. FIG. 13 shows relatively good image compared to the images in FIGS. 11 and 12.

In image processing apparatus according to some embodiments of the inventive subject matter, strong, weak and adaptive UMF modes may be provided. The strong mode uses a relatively high UMF coefficient, the weak mode uses a relatively low UMF coefficient and the adaptive mode uses an adaptive UMF coefficient.

Therefore, the mage processing device according to some embodiments of the inventive subject matter may enhance the definition for an input image depending on the various modes.

Also, by controlling the UMF coefficient appropriately using the color difference of the input image, it is possible to enhance the definition.

What is claimed is:

1. An image processing device, comprising:
   a color extractor circuit configured to extract color information from input image data;
   a color shifter circuit configured to color shift the input image data according to the extracted color information and to determine a gain responsive to the extracted color information; and
   a definition enhancement circuit configured to detect a color difference from the color-shifted image data and to unsharp mask filter the color-shifted image data according to the detected color difference, the definition enhancement circuit comprising:
      a filter configured to unsharp mask filter the color-shifted image data;
      a color difference and gain controller circuit configured to detect the color difference from the color-shifted image data and to adaptively modify or replace the unsharp mask filtered image data according to the detected color difference to generate adaptively processed image data, the color difference and gain controller circuit comprising a color difference detector circuit configured to detect the color difference by comparing image data for center pixels of respective groups of pixels of the color-shifted image data to image data for pixels surrounding the center pixels in the respective groups and an image data modification circuit configured to modify the unsharp mask filtered image data according to the detected color difference; and
      a gain multiplier circuit configured to apply the determined gain to the adaptively processed image data.

2. The image processing device of claim 1, wherein the extracted color information comprises a minimum brightness value and a maximum brightness value and wherein the color shifter circuit is configured to color shift the input image data responsive to the minimum and maximum brightness values.

3. The image processing device of claim 1:
   wherein the color shifter circuit is further configured to determine a high gain and a low gain responsive to the extracted color information;
   wherein the gain multiplier circuit is configured to generate low gain image data and high gain image data from the adaptively processed image data according to the determined low gain and high gain; and
   wherein the definition enhancement circuit further comprises a channel difference checker circuit configured to compare image data for center pixels of groups of pixels of the color-shifted image data to the high gain image data.

4. The image processing device of claim 3, wherein the channel difference checker circuit is configured to generate a gain select signal responsive to the comparison of the image data for the center pixels to the high gain image data and wherein the definition enhancement circuit further comprises a multiplexer configured to selectively output the high gain image data and the low gain image data responsive to the comparison.

5. The image processing device of claim 1, wherein the image data modification circuit comprises:
   a first multiplexer configured to selectively provide the image data for the center pixels or unsharp mask filtered image data to the gain multiplier circuit; and a gain controller circuit configured to control the first multiplexer responsive to the detected color difference.

6. The image processing device of claim 5:

wherein the image data modification circuit further comprises:
- a shifter configured to scale the unsharp mask filtered image data; and
- a second multiplexer configured to selectively provide the unsharp mask filtered image data or the scaled unsharp mask filtered image data to the first multiplexer; and wherein the gain controller circuit is further configured to control the second multiplexer responsive to the detected color difference.

7. The image processing device of claim 6, wherein the gain controller circuit and the first and second multiplexers are configured to provide the image data for the center pixels to the gain multiplier circuit when the detected color difference is less than a first threshold, to provide the scaled unsharp mask filtered image data to the gain multiplier circuit when the detected color difference is greater than the first threshold and less than a second threshold and to provide the unsharp mask filtered image data to the gain multiplier when the detected color difference is greater than the second threshold.

* * * * *